US008736089B2

(12) United States Patent
Indig et al.

(10) Patent No.: US 8,736,089 B2
(45) Date of Patent: May 27, 2014

(54) ELECTRIC GENERATOR OPERATED BY RANDOM MOTION

(71) Applicants: Moshe Indig, Ramat Gan (IL); Moshe Aharon, Rechelim, IL (US)

(72) Inventors: Moshe Indig, Ramat Gan (IL); Moshe Aharon, Rechelim, IL (US)

( * ) Notice: Subject to any disclaimer, the term of this patent is extended or adjusted under 35 U.S.C. 154(b) by 0 days.

(21) Appl. No.: 13/681,439

(22) Filed: Nov. 20, 2012

(65) Prior Publication Data

US 2013/0127178 A1 May 23, 2013

Related U.S. Application Data

(60) Provisional application No. 61/561,954, filed on Nov. 21, 2011.

(51) Int. Cl.
*H02P 9/04* (2006.01)

(52) U.S. Cl.
USPC ............................................ 290/1 R

(58) Field of Classification Search
USPC ............................................ 290/1 R
See application file for complete search history.

(56) References Cited

U.S. PATENT DOCUMENTS

| 2002/0175520 A1* | 11/2002 | Jacobsen | 290/1 R |
| 2007/0035134 A1* | 2/2007 | Bristow, Jr. | 290/1 R |
| 2008/0174188 A1 | 7/2008 | Cederwall | |
| 2010/0237631 A1* | 9/2010 | Yu | 290/1 R |

FOREIGN PATENT DOCUMENTS

CN 201541177 U 8/2010

* cited by examiner

*Primary Examiner* — Tho D Ta
(74) *Attorney, Agent, or Firm* — Mark M. Friedman

(57) ABSTRACT

It is disclosed a device which includes an elongated member, and an energy convertor. The elongated member has a base side and a free end. A certain direction is defined by a line connecting centers of the base side and the free end. The free end oscillates relative to the base side, in a response to a mechanical excitation, in a direction substantially perpendicular to the certain direction. The energy convertor converts mechanical energy of the oscillations of the free end to electrical energy. The energy convertor includes a coil attached to the free end, and a permanent magnet tightly fixed to the base side. Mechanical oscillation of the coil relative to the permanent magnet induces a flow of alternate current from the energy convertor. The energy convertor is electrically connected to a current rectifier for rectifying the alternate current, whereas the rectified direct current feeds a battery. The device is installed within a host mobile device, and the base side is fixed to the host mobile device. The device is enclosed within a vacuum chamber such as to prevent dissipation of energy of the mechanical oscillation by air friction.

19 Claims, 3 Drawing Sheets

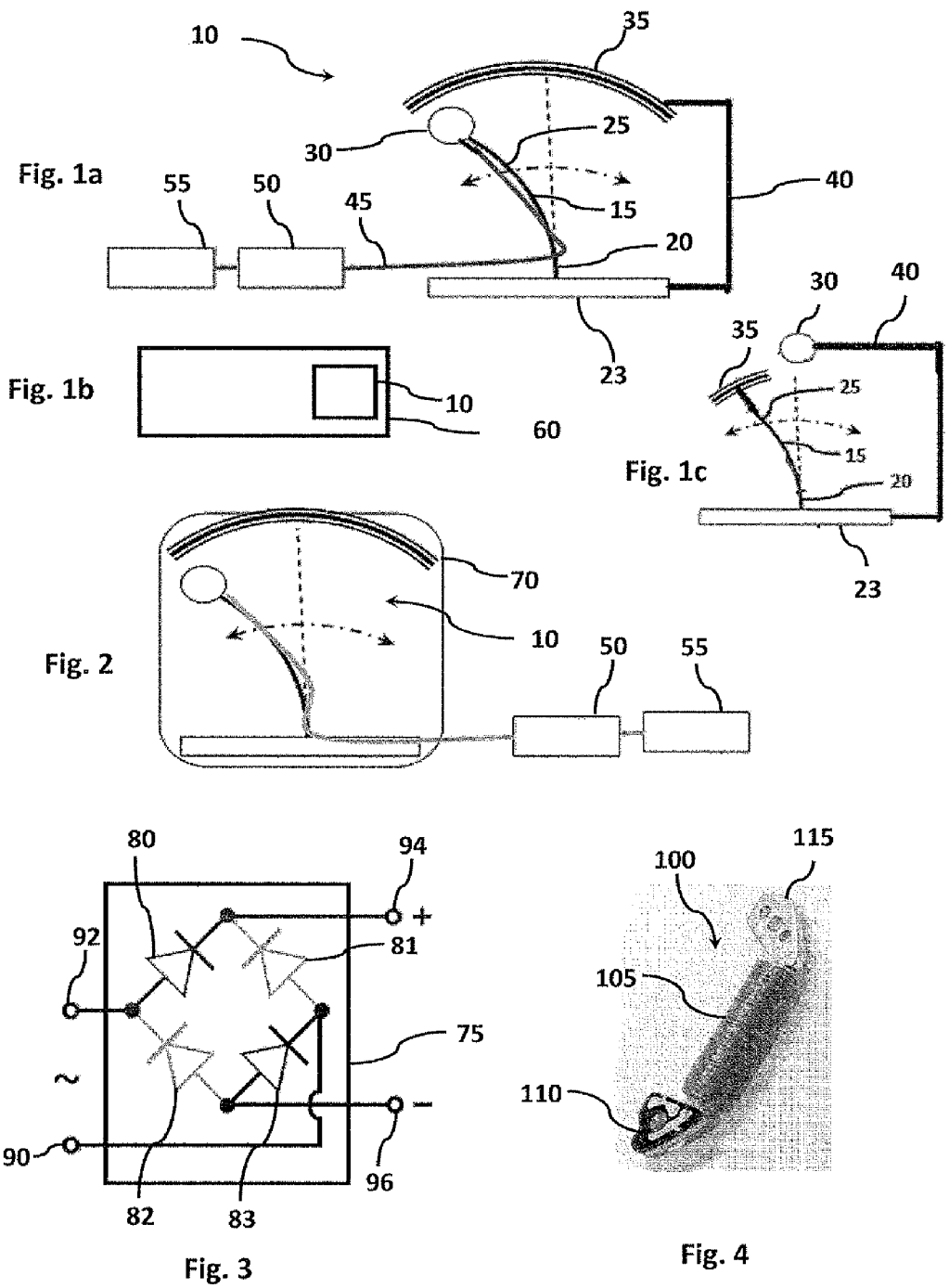

ELECTRIC GENERATOR OPERATED BY RANDOM MOTION

CROSS REFERENCE TO RELATED PATENT APPLICATION

The current application claims the priority rights of U.S. provisional patent application No. 61/561,954 entitled "NANO GENERATORS: GENERATING POWER SUPPLY FROM RANDOM MOTION" filed Nov. 21, 2011 by Moshe Indig.

BACKGROUND OF THE INVENTION

1. Field of the Invention

The invention is in the field of energy harvesting for feeding mobile devices, and especially deals with feeding a mobile device like a cellular phone by converting random motion to certain mechanical oscillation, which in turn is converted to electrical energy feeding a battery of the cellular phone.

2. Description of Related Art

Mechanisms for using random motion of clocks for feeding them with operational energy are known since the era of purely mechanical clocks. With the transition to electrical mechanism, certain ways to harvest energy for feeding the clock with electrical energy have been suggested. In one way, a tiny solar cell collects some light, and convert it to electrical energy for feeding a small battery of the clock. In a second way, a mechanical mechanism excites a cog-wheel which drives a rotational electrical generator.

Mobile phones need a frequent connection to a mains power supply for refilling the battery, in accordance with the intensity of using the mobile phone. Harvesting energy from the environment or from random motion may expand the time intervals between charges. A simple mechanism which may be constructed cheaply is desired in order to keep the phone production cost at low level. Thus, it is an objective of the current invention to suggest a simple method to feed a mobile device by use of available random motion.

BRIEF SUMMARY OF THE INVENTION

It is disclosed, according to some preferred embodiments of the current invention, a device which includes an oscillating member, and an energy convertor. The oscillating member has a base side and a free end. A certain direction is defined by a line connecting centers of the base side and the free end. The free end oscillates relative to the base side, in a response to a mechanical excitation, in a direction substantially perpendicular to the certain direction. The energy convertor converts mechanical energy of the oscillations of the free end to electrical energy. The energy convertor includes a first member attached to the free end, and a second member tightly fixed to the base side. The first member and the second member are close such as to be associated by an electromagnetic field. Mechanical oscillation of the first member relative to the second member induces a flow of alternate current from the energy convertor.

In some embodiments the oscillating member is an elongated member having the base side and the free side disposed on two countering sides of the long direction.

In some embodiments, the energy convertor is electrically connected to a current rectifier for rectifying the alternate current, whereas the rectified direct current feeds an electrical storage.

In some embodiments, an electrical coil is attached to the free end, a permanent magnet is tightly fixed to the base side, and a magnetic field induced by the permanent magnet induces an alternate current flow in the electrical coil while the free end is oscillating. Preferably, the alternate current flows along conductors coupled to the elongated member.

In some embodiments, a permanent magnet is attached to the free end, an electrical coil is tightly fixed to the base side, and the permanent magnet induces an electromagnetic field causing the electrical coil to provide the alternate current.

In some embodiments, the device is installed within a host mobile device, and the base side is fixed to the host mobile device. A motion of the mobile device induces mechanical oscillations of the free end, and mechanical energy of the mechanical oscillations is converted to electrical energy feeding the mobile device.

In some embodiments, at least 70% of mechanical energy of the mechanical oscillation is converted to stored electrical energy.

In some embodiments, the elongated member is a flat element of substantially uniform thickness having a recessed portion between the base side and the free end, such as to allow the free end a mechanical freedom to oscillate relative to the base side. Preferably, the flat element is recessed in two orthogonal directions.

In some embodiments, the device is at least partially enclosed within a vacuum chamber such as to prevent dissipation of energy of the mechanical oscillation by air friction. Preferably, at least 80% of the oscillation mechanical energy is converted to stored electrical energy.

In some embodiments, the elongated member is made of a material having hardness in the range of 6-7 MOHS.

In some embodiments, a spring connect the base side to the free end.

It is disclosed according to some preferred embodiments of the current invention, a device which includes an elongated flat member of substantially uniform first thickness over the majority of its area, and an energy convertor. The elongated flat member has several recessed portions, disposed between a base side and a free end, such that the free end being free to oscillate relative to the base side. The energy convertor converts mechanical energy of the oscillations of the free end to electrical energy. The energy convertor includes a first member attached to the free end, and a second member tightly fixed to the base side. An electromagnetic field associates the first member and the second member. Oscillation of the first member relative to the second member induces a flow of alternate current from the energy convertor.

In some embodiments, a recessed portion has a second thickness of 3% to 10% of the first thickness over majority of its area.

In some embodiments, the elongated member has several recessed portions, and a passage is disposed between each two adjacent recessed portions.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

FIG. 1a illustrates a device for converting random motion to useable electric energy.

FIG. 1b illustrates the device of FIG. 1a installed within a host mobile device.

FIG. 1c illustrates a device for converting random motion to useable electric energy, having a permanent magnet attached to a free end of an elongated member.

FIG. 2 illustrates a device for converting random motion to useable electric energy installed in a vacuum chamber such as to prevent dissipation of mechanical energy by air friction.

FIG. 3 is an exemplary rectifier for converting alternate current provided by the energy convertor to direct current for storing in a battery.

FIG. 4 is an exemplary electric coil.

DETAILED DESCRIPTION OF THE INVENTION

Figure 5A:
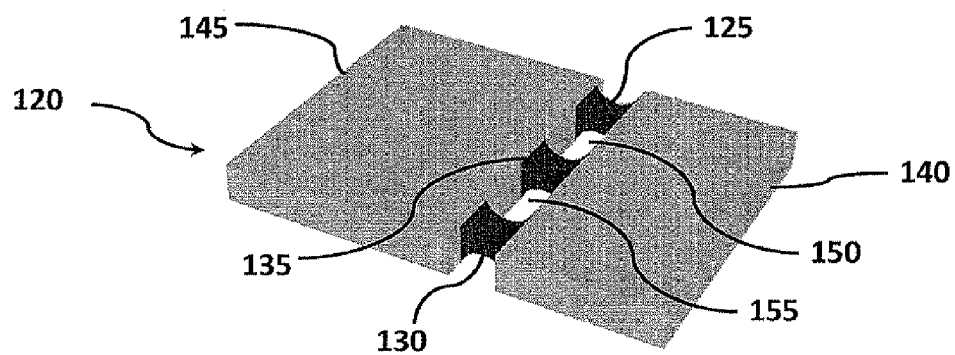
FIG. 5a is an isometric view of an elongated flat member having a base side and a free side and a recessed portion therebetween.

The present invention will now be described in terms of specific example embodiments. It is to be understood that the invention is not limited to the example embodiments disclosed. It should also be understood that not every feature of the methods and systems handling the described device is necessary to implement the invention as claimed in any particular one of the appended claims. Various elements and features of devices are described to fully enable the invention.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

The current invention is illustrated in FIG. 1a, which shows a device 10 which includes an elongated oscillating member 15, and an energy convertor. Elongated member 15 has a base side 20 and, a free end 25. Base side 20 is fixed to a base 23 having or being coupled to a mass much larger than the mass of device 10. A certain direction is generally defined by a line connecting centers of base side 20 and free end 25, i.e. in the long axis of the elongated member 15. Free end 25 oscillates relative to base side 20, in a response to a mechanical excitation of device 10, in a direction substantially perpendicular to the certain direction. The energy convertor converts mechanical energy of the oscillations of free end 25 to electrical energy. The energy convertor includes an electrical coil 30 coupled to free end 25, and a permanent magnet 35 tightly fixed to the base side by a solid connector 40. Electrical coil 30 and permanent magnet 35 are close such as to be associated by an electromagnetic field. Consequently, mechanical oscillation of electrical coil 30 relative to permanent magnet 35 changes the magnetic field sensed by electrical coil 30, and thus induces a flow of alternate current from coil 30.

Device 10 may be used in mobile devices like mobile phones to empower their battery. FIG. 1b illustrates a device 10 installed within a host mobile device 60, wherein base side 20 is fixed to host mobile device 60. A motion of mobile device 60, such as the motion cased by walking, holding the mobile device for calling and any random motion, induces mechanical oscillations of free end 25, and mechanical energy of the mechanical oscillations is converted to electrical energy feeding mobile device 60. The installation of device 10 in a mobile device 60 expands the time intervals between charges of the mobile device by a mains power. Furthermore, in case no mains power is available, and there is an urgent need to make a phone call, a user may gently shake the mobile phone for a while to provide the urgently needed electric supply.

Electric coil 30 is electrically connected by a wire pair 45 to a current rectifier 50 for rectifying the alternate current, whereas the rectified direct current feeds an electrical storage 55, usually a rechargeable battery.

To evaluate the mechanical to electrical energy conversion efficiency, experiments have been conducted with an exemplary device 10 having the following coil parameters: length 7 mm, 3920 turns, resistance of 3000 ohms, inductance of 26000 MicroHenry. In the experiment, the force F needed to hold free end 25 at some displacement amplitude A relative to a rest state has been measured by a dynamometer to yield an elastic constant k. Once the free end is released to oscillate freely, the mechanical energy stored in the vibrations is $kA^2/2$. In the experiment, the stored energy is found to be $2.5 \cdot 10^{-6}$ Joule. The mechanical energy dissipates by the conversion to electrical energy. The electrical energy delivered to the battery is calculated as the time integral of the iv product, where i and v are respectively the direct current and direct voltage at the entrance to a battery 55. The experiments showed that 77% of the mechanical energy of the mechanical oscillation is converted to stored electrical energy. To be conservative, at least 70% of the mechanical energy is assumed to be converted to electrical energy stored in a battery or in a capacitor.

It is also noted that the threshold mechanical energy desired for excitation of the oscillation energy is quite low, and estimated to be as low as $0.4 \cdot 10^{-6}$ Joule.

In some embodiments, as shown in FIG. 1e, a permanent magnet 35 is attached to free end 25, an electrical coil 30 is tightly fixed to base 23. The motion of permanent magnet 35 induces a varying electromagnetic field on coil 30, thus causing electrical coil 30 to provide alternate current.

Part of the mechanical energy stored in the free end oscillation is dissipated by friction with air. FIG. 2 presents a schematic drawing of a device 10 enclosed within a vacuum chamber 70 such as to prevent dissipation of energy of the mechanical oscillation by air friction. As a result, at least 80% of the oscillation mechanical energy is converted to stored electrical energy.

The electric scheme of an exemplary rectifier 75 is shown in FIG. 3. Rectifier 75 is a traditional rectifier which includes four diodes 80, 81, 82 and 83 in a bridge, such that an alternate current entering the bridge through input terminals 90 and 92 is converted to a direct current provided in output terminals 94 and 96.

An image of a coil 100 is shown in FIG. 4, having numerous turns 105 between terminals 110 and 115. Terminals 110 and 115 are used to fix coil 100 to free end 25 or to solid connector 40, and for electrically connecting coil 100 to rectifier 50.

Figure 5B:
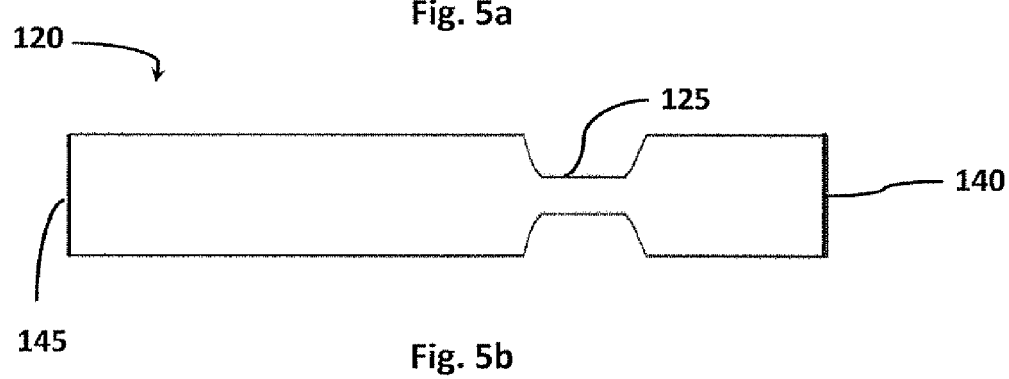
FIG. 5b is a side view of the elongated flat member.
Figure 5C:
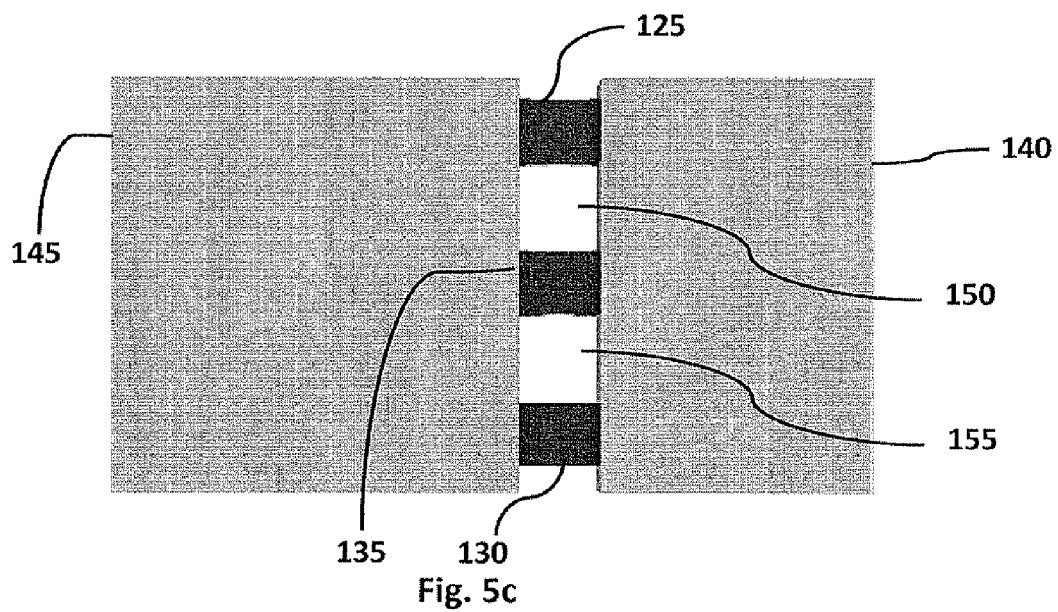
FIG. 5c is a top view of the elongated flat member.

Referring now to an embodiment of the elongated member, FIGS. 5a, 5b and 5c present, respectively, an isometric view, a side view and a top view of a flat elongated member 120. It has a substantially uniform thickness and recessed portions or hinges 125, 130 and 135 between a base side 140 and a free end 145, such as to allow free end 145 a mechanical freedom to oscillate relative to base side 140. The flat element is recessed in both the thickness and the width of flat elongated member 120. Passages 150 and 155 are disposed respectively between recessed portions 125 and 135, and between recessed portions 130 and 135.

The recessed portions 125, 130 and 135 have a thickness between 3% and 10% of the thickness of the majority of flat member 120.

Elongated member 120 is made of a hard material etched between base side 140 and free end 145. Typically, the hard material has hardness in the range of 6-7 MOHS. Exemplary construction materials of elongated member 120 are stainless steel 301 High Yield temper, liquid metal alloy, crystalline Silicon, and Pyrex glass.

Figure 6:
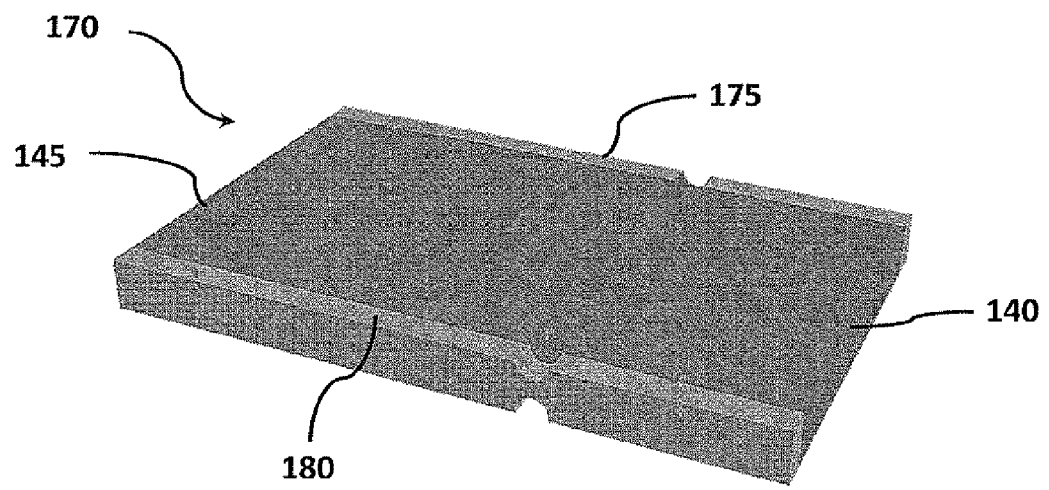
FIG. 6 is an isometric view of an elongated flat member having a base side, a free side, a recessed portion therebetween, and two electrical conducting channels superimposed over the surface of the elongated flat member.

The alternate current from an oscillating coil may flow along conductor pair 45 which is coupled to elongated member 15 as shown in FIGS. 1a and 2. In a different embodiment, illustrated in FIG. 6, two conducting channels are disposed, by a way of coating for example, along elongated member 170, carrying the alternate current from electric coil 30 which is connected to free side 145 to a rectifier 50 which is disposed close to base 23.

Figure 7:
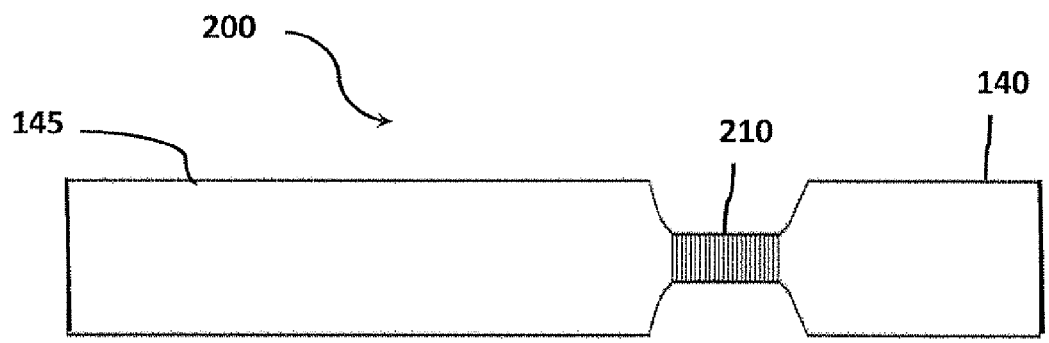
FIG. 7 is a side view of an elongated member having a spring coupling a side base and a free end.

In an embodiment of an elongated member 200, shown in FIG. 7, a spring 210 connects base side 140 to free end 145. Spring 210 may have an elliptical cross section such that the direction of oscillation is forced to be in a specific direction perpendicular to the long direction of the elongated member 200.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. A host mobile device installed with an electrical energy providing device for electrical energy feeding of the mobile device, the electrical energy providing device comprising:
(a) an oscillating member having a base side and a free end, a certain direction being defined by a line connecting centers of said base side and said free end;
(b) said base side being fixed to the host mobile device;
(c) said free end being free to oscillate relative to said base side in a direction substantially perpendicular to said certain direction, the oscillations being excited by a motion of said host mobile device; and
(d) an energy convertor configured to convert mechanical energy of the oscillations of said free end to electrical energy, said energy convertor comprising:
(i) a first member attached to said free end;
(ii) a second member tightly fixed to said base side; and
(iii) said first member and said second member being close such as to be associated by an electromagnetic field,
wherein a motion of said mobile device exciting mechanical oscillations of said first member relative to said second member, which in turn inducing a flow of alternate current from said energy convertor, feeding said host mobile device with electrical energy.

2. The mobile device of claim 1 wherein said oscillating member is an elongated member having said base side and said free side disposed on two opposing sides of a long direction of said elongated member.

3. The host mobile device of claim 1 wherein an electrical coil serves as said first member and is attached to said free end, a permanent magnet serves as said second member and is tightly fixed to a base of the electrical energy providing device, and a magnetic field induced by said permanent magnet inducing an alternate current flow in said electrical coil while said free end is oscillating.

4. The host mobile device of claim 1 wherein a permanent magnet serves as said first member and is attached to said free end, an electrical coil serves as said second member and is tightly fixed to a base of the electrical energy providing device, and said permanent magnet inducing an electromagnetic field causing said electrical coil to provide said alternate current.

5. The host mobile device of claim 1 wherein at least 70% of mechanical energy of said mechanical oscillations is converted to stored electrical energy.

6. The host mobile device of claim 1 wherein said elongated member is made of a material having hardness in the range of 6-7 MOHS.

7. The host mobile device of claim 1 wherein one or more springs connect said base side to said free end.

8. The host mobile device of claim 1 wherein said energy convertor is electrically connected to a current rectifier for rectifying said alternate current, the rectified direct current feeding an electrical storage.

9. The host mobile device of claim 8 wherein said alternate current flows along conductors coupled to said oscillating member.

10. A device comprising:
(a) an oscillating member having a base side and a free end, a certain direction being defined b a line connecting centers of said base side and said free end;
(b) said free end being free to oscillate relative to said base side, in a response to a mechanical excitation, in a direction substantially perpendicular to said certain direction;
(c) an energy convertor configured to convert mechanical energy of the oscillations of said free end to electrical energy, said energy convertor comprising:
(i) a first member attached to said free end;
(ii) a second member tightly fixed to said base side; and
(iii) said first member and said second member being close such as to be associated by an electromagnetic field,
wherein mechanical oscillation of said first member relative to said second member inducing a flow of alternate current from said energy convertor; and
(d) said elongated member being a flat element of substantially uniform thickness having at least one recess between said base side and said free end such as to allow said free end a mechanical freedom to oscillate relative to said base side.

11. The device of claim 10 wherein said flat element is recessed in two orthogonal directions.

12. A device comprising:
(a) an oscillating member having a base side and a free end, a certain direction being defined by a line connecting centers of said base side and said free end;

(b) said free end being free to oscillate relative to said base side, in a response to a mechanical excitation, in a direction substantially perpendicular to said certain direction; and (c) an energy convertor configured to convert mechanical energy of the oscillations of said free end to electrical energy said energy convertor comprising:
  (i) a first member attached to said free end;
  (ii) a second member tightly fixed to said base side; and
  (iii) said first member and said second member being close such as to be associated by an electromagnetic field:
    wherein mechanical oscillation of said first member relative to said second member inducing a flow of alternate current from said energy convertor; and (d) the device is at least partially enclosed within a vacuum chamber such as to prevent dissipation of energy of said mechanical oscillation by air friction.

13. A device comprising:
(a) an elongated flat member of substantially uniform first thickness over the majority of its area, having one or more recessed portions, the recessed portions being disposed between a base side and a free end of said elongated flat member, such that said free end being free to oscillate relative to said base side; and
(b) an energy convertor configured to convert mechanical energy of the oscillations of said free end to electrical energy, said energy convertor comprising:
  (i) a first member attached to said free end;
  (ii) a second member tightly fixed to said base side; and
  (iii) an electromagnetic field associating said first member and said second member,
    wherein oscillations of said first member relative to said second member inducing a flow of alternate current from said energy convertor.

14. The device of claim 13 wherein at least one recessed portion has a second thickness over majority of area of said at least one recessed portion, said second thickness being between 3% and 10% of said first thickness.

15. The device of claim 13 wherein said free end being free to oscillate, in a response to a mechanical excitation, in a direction substantially perpendicular to a line connecting centers of said base side and said free end.

16. The device of claim 13 wherein an electrical coil serves as said first member and is attached to said free end, a permanent magnet serves as said second member and is tightly fixed to a base of the device, and a magnetic field induced by said permanent magnet inducing alternate current flow in said electrical coil while said free end is oscillating.

17. The device of claim 13 wherein a permanent magnet serves as said first member and is attached to said free end, an electrical coil serves as said second member and is tightly fixed to a base of the device, and in motion, said permanent magnet induces an electromagnetic field causing said electrical coil to provide alternate current.

18. The device of claim 13 wherein the device is installed within a host mobile device, wherein a motion of said mobile device induces a mechanical oscillation of said free end, and the oscillation is converted to electrical energy feeding said mobile device.

19. The device of claim 13 wherein said elongated member has at least two recessed portions, and a passage is disposed between each two adjacent recessed portions.

* * * * *